(12) United States Patent
Bhattacharjee et al.

(10) Patent No.: US 10,244,403 B2
(45) Date of Patent: Mar. 26, 2019

(54) CLOUD BASED ACCESS NETWORK

(71) Applicant: NOKIA SOLUTIONS AND NETWORKS OY, Espoo (FI)

(72) Inventors: Parijat Bhattacharjee, Bangalore (IN); Vishnu Ram Omanakutty Amma Vijayaraghavan, Bangalore (IN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/309,557

(22) PCT Filed: May 8, 2014

(86) PCT No.: PCT/EP2014/059447
§ 371 (c)(1),
(2) Date: Nov. 8, 2016

(87) PCT Pub. No.: WO2015/169370
PCT Pub. Date: Nov. 12, 2015

(65) Prior Publication Data
US 2017/0156065 A1    Jun. 1, 2017

(51) Int. Cl.
*H04W 16/18* (2009.01)
*H04W 16/26* (2009.01)
*H04W 88/08* (2009.01)

(52) U.S. Cl.
CPC .......... *H04W 16/18* (2013.01); *H04W 16/26* (2013.01); *H04W 88/085* (2013.01)

(58) Field of Classification Search
CPC .................................................... H04W 16/18
See application file for complete search history.

(56) References Cited

U.S. PATENT DOCUMENTS

2008/0134194 A1*  6/2008  Liu ........................ H04W 16/04
                                                          718/105
2009/0149221 A1*  6/2009  Liu ..................... H04W 88/085
                                                          455/561

(Continued)

FOREIGN PATENT DOCUMENTS

WO    WO 2012/123228 A1    9/2012
WO    WO 2013/072108 A1    5/2013

OTHER PUBLICATIONS

International Search Report and Written Opinion dated Jan. 9, 2015 corresponding to International Patent Application No. PCT/EP2014/059447.

(Continued)

*Primary Examiner* — Mazda Sabouri
(74) *Attorney, Agent, or Firm* — Squire Patton Boggs (US) LLP

(57) ABSTRACT

A method and an apparatus for designing a cloud based radio access network, C-RAN, are provided. The solution comprises dividing (302) the access network into two or more tiers having different processing capabilities; receiving as an input information about the physical location of one or more remote radio heads, RRH, of the network and required quality of service of the remote radio heads; and determining (306) the physical location of the tier, BBU, having most efficient processing capability for serving the remote radio heads on the basis of the information about the location and required quality of service of at least part of the one or more remote radio heads.

18 Claims, 3 Drawing Sheets

(56) References Cited

U.S. PATENT DOCUMENTS

| | | | |
|---|---|---|---|
| 2012/0106963 A1* | 5/2012 | Huang | H04Q 11/0067 398/66 |
| 2012/0233625 A1 | 9/2012 | Sabin et al. | |
| 2012/0271949 A1 | 10/2012 | Tan et al. | |
| 2012/0300615 A1 | 11/2012 | Kempf et al. | |
| 2012/0323848 A1 | 12/2012 | Hildebrand et al. | |
| 2013/0073716 A1 | 3/2013 | Dejana et al. | |
| 2013/0281049 A1 | 10/2013 | Lee et al. | |
| 2014/0226736 A1* | 8/2014 | Niu | H04L 27/2628 375/260 |
| 2014/0293784 A1* | 10/2014 | Haberland | H04W 28/08 370/235 |

OTHER PUBLICATIONS

Georgios Karagiannis et al: "Mobile Cloud Networking: Virtualisation of Cellular Networks," 2014 21st International conference on Telecommunications (ICT), IEEE, May 4, 2014, pp. 410-415, XP032612088.

Naoki Agata et al.: "A Design Algorithm for Ring Topology Centralized-Radio-Access-Network," 17th International conference on Optical Networking Design and Modeling (ONDM 2013); Apr. 16-19, 2013, Brest, France, IEEE, Apr. 16, 2013, pp. 173-178, XP032419253.

Anup Kulkarni et al.: "Development of a Remote Lab with Microprocessor & DSP with FPGA Accelerator," IEEE, 2013, 5 pages.

Linh T.X. Phan et al.: "An Empirical Analysis of Scheduling Techniques for Real-time Cloud-Based Data Processing," Service-Oriented Computing and Applications (SOCA); 2011 IEEE International Conference on Digital Object Identifier, 8 pages.

Karsten Oberle et al.: "The Network Aspect of Infrastructure-as-a-Service," 2010, IEEE, 6 pages.

English translation of Notification of Grounds for Rejection dated Jan. 22, 2018 corresponding to Japanese Patent Application No. 2017-510725.

Japanese Office Action issued in corresponding Japanese Patent Application No. 2017-510725 dated Nov. 1, 2018.

* cited by examiner

CLOUD BASED ACCESS NETWORK

FIELD

The exemplary and non-limiting embodiments of the invention relate generally to wireless communication systems. Embodiments of the invention relate especially to apparatuses, methods, and computer program products in communication networks.

BACKGROUND

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

Communication networks are constantly under development. For example, the data rates supported by different radio communication networks are constantly increasing. High data rates are offered by 3rd generation networks utilising HSPA (High Speed Packet Access) and $4^{th}$ generation Long Term Evolution (LTE) or the LTE-Advanced (LTE-A)), for example.

The air interfaces of the current and future networks are capable of supporting much higher data rates as compared to wireless technologies of previous generations, effectively putting much more stress on the processing performed at the various network elements that support the air interface. The increase in data rates has made the use of smart phones more popular adding more data traffic volume to the networks.

As the demand for wireless data consumption keeps increasing, telecom companies and operators are looking at innovative ways of meeting user expectations and enhancing the user experience even further. One of the essential aspects of this push is the densification of the radio access networks by adding low power base stations or access points such as micro, pico and femto access points. These low power base stations require connections to the other parts of the networks. This requires significant investments.

One possible implementation of low power base stations is to utilise remote radio heads (RRH). A remote radio head comprises a part of the elements of a conventional base station. Typically, a remote radio head comprises radio frequency equipment, analogue-to-digital/digital-to-analogue converters and up/down converters, for example. Rest of the base station functionality may be situated elsewhere.

A cloud based solution may help reduce the footprint of individual base stations. It would also contain the complexity of the RRH to an extent making it essentially a plug and play device that would be cheaper to buy and easier to install and maintain. The cloud itself by definition is scalable and elastic with the ability to add and remove nodes dynamically. The compute elements of a cloud based networks could therefore also be scaled up and down relatively easily. However, traditional clouds are designed to handle a large number of parallel processing tasks. MapReduce architecture is typically used to provide a capability to process large data sets with a distributed algorithm on a cluster of interconnected computing devices.

However, the requirements of a communication system are different and designing a cloud based communication system is not a trivial task.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus for designing a cloud based access network, comprising: at least one processor; and at least one memory including computer program code, the at least one memory and the computer program code configured to, with the at least one processor, cause the apparatus at least to: divide the access network into two or more tiers having different processing capabilities; receive as an input information about the physical location of one or more remote radio heads of the network and required quality of service of the remote radio heads; determine the physical location of the tier having most efficient processing capability for serving the remote radio heads on the basis of the information about the location and required quality of service of at least part of the one or more remote radio heads.

According to an aspect of the present invention, there is provided a method for designing a cloud based access network, comprising: dividing the access network into two or more tiers having different processing capabilities; receiving as an input information about the physical location of one or more remote radio heads of the network and required quality of service of the remote radio heads; and determining the physical location of the tier having most efficient processing capability for serving the remote radio heads on the basis of the information about the location and required quality of service of at least part of the one or more remote radio heads.

According to an aspect of the present invention, there is provided a computer program embodied on a distribution medium, comprising program instructions which, when loaded into an electronic apparatus for designing a cloud based access network, are configured to control the apparatus to execute: divide the access network into two or more tiers having different processing capabilities; receive as an input information about the physical location of one or more remote radio heads of the network and required quality of service of the remote radio heads; determine the physical location of the tier having most efficient processing capability for serving the remote radio heads on the basis of the information about the location and required quality of service of at least part of the one or more remote radio heads.

LIST OF DRAWINGS

Embodiments of the present invention are described below, by way of example only, with reference to the accompanying drawings, in which FIG. 1 illustrates an example of a communication environment;

DESCRIPTION OF EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain also features, structures, units, modules etc. that have not been specifically mentioned.

The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, embodiments.

Many different radio protocols to be used in communications systems exist. Some examples of different communication systems are the universal mobile telecommunications system (UMTS) radio access network (UTRAN or E-UTRAN), long term evolution (LTE®, known also as E-UTRA), long term evolution advanced (LTE-A®), Wireless Local Area Network (WLAN) based on IEEE 802.11standard, worldwide interoperability for microwave access (WiMAX), Bluetooth®, personal communications services (PCS) and systems using ultra-wideband (UWB) technology. IEEE refers to the Institute of Electrical and Electronics Engineers. LTE and LTE-A are developed by the Third Generation Partnership Project 3GPP.

Embodiments of the invention are applicable to communication system or any combination of different communication systems that support required functionalities.

Figure 1:
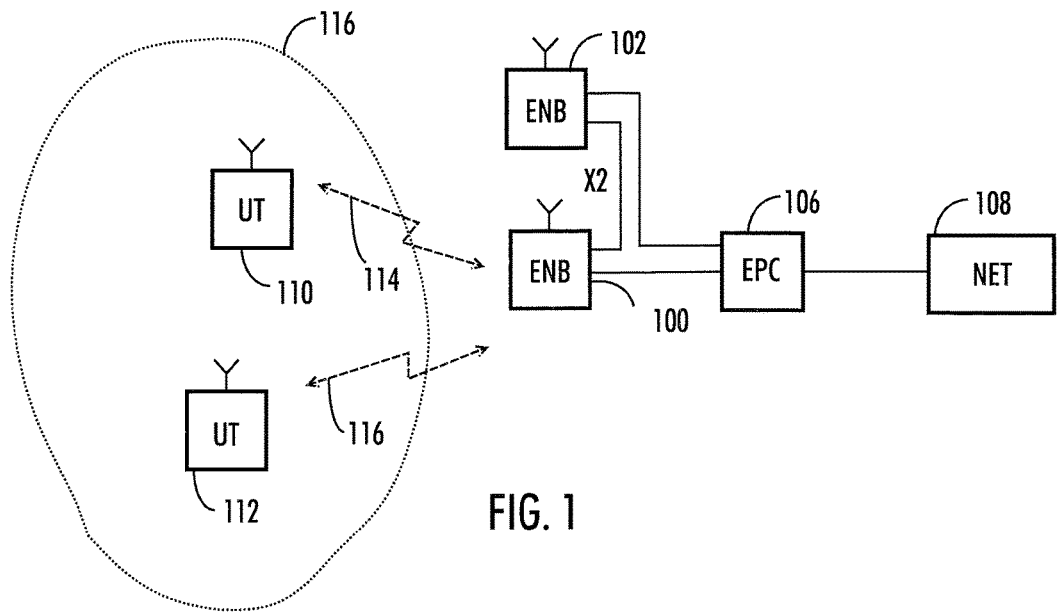

FIG. 1 illustrates an example of an access architecture based on a long term evolution advanced (LTE Advanced, LTE-A) system. The LTE-A system is one of a system where embodiments of the invention may be applied.

FIG. 1 illustrates a simplified view of a communication environment only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for communication are irrelevant to the actual invention. Therefore, they need not to be discussed in more detail here.

FIG. 1 shows eNodeBs 100 and 102 connected to an evolved Packet Core EPC 106 of a communication system. The eNodeBs may be connected to each other over an X2 interface. The eNodeB's form a part of the radio access network (RAN) of the communication system.

The eNodeBs 100, 102 that may also be called base stations of the radio system may host the functions for Radio Resource Management: Radio Bearer Control, Radio Admission Control, Connection Mobility Control, Dynamic Resource Allocation (scheduling). Depending on the system, the counterpart on the EPC side can be a serving gateway (S-GW, routing and forwarding user data packets), packet data network gateway (P-GW, for providing connectivity of user devices (UEs) to external packet data networks), and/or mobile management entity (MME), etc. The MME (not shown) is responsible for the overall user terminal control in mobility, session/call and state management with assistance of the eNodeBs through which the user terminals may connect to the network.

The communication system is also able to communicate with other networks, such as a public switched telephone network or the Internet 108. It should be appreciated that eNodeBs or their functionalities may be implemented by using any node, host, server or access point etc. entity suitable for such a usage.

The user terminals UT 110, 112 (also called user device, user equipment, terminal device, etc.) illustrate one type of an apparatus to which resources on the air interface may be allocated and assigned, and thus any feature described herein with a user device may be implemented with a corresponding apparatus, such as a relay node. An example of such a relay node is a layer 3 relay (self-backhauling relay) towards the base station.

The user terminal typically refers to a portable computing device that includes wireless mobile communication devices operating with or without a subscriber identification module (SIM), including, but not limited to, the following types of devices: a mobile station (mobile phone), smartphone, personal digital assistant (PDA), device using a wireless modem (alarm or measurement device, etc.), laptop and/or touch screen computer, tablet, game console, notebook, and multimedia device.

The user terminal (or in some embodiments a layer 3 relay node) is configured to perform one or more of user equipment functionalities. The device may also be called a subscriber unit, mobile station, remote terminal, access terminal, user equipment (UE) just to mention but a few names or apparatuses.

Further, although the apparatuses have been depicted as single entities, different units, processors and/or memory units (not all shown in FIG. 1) may be implemented.

The communication network described above may be able to support the usage of cloud services. In cloud implementation, the radio access network or a part of it may be realised with computing resources connected with each other with communication links. The computing resources may be realised with servers connected with each other with TCP/IP network, the Internet or other suitable network, for example. In addition, the EPC or a part of it may be implemented with cloud services.

Converting a part of a communication system such as described above to cloud based architecture is a non-trivial activity. The communication systems comprise components of many different types and requirements. All software components cannot simply be placed in the cloud. The cloud requirements and Key Performance Indexes (KPIs) for wireless operators are different from other applications, these have to be captured while provisioning and configuring the cloud.

Especially wireless communication systems have functions that fall under different latency and computation brackets. Functions closer to the RAN such as the packet scheduler need to have very low latency in order to schedule radio resources on even per millisecond basis. The scheduler algorithms are often not parallel and the data sets are not as large as envisaged in normal cloud computing problems. Such functions in the telecom domain would require high performance processing power from cloud systems.

On the other hand, functions within the EPC generally have easier latency requirements. Since they handle larger numbers of users and handle a lot of the data traffic, these are more amenable to the generic cloud architecture.

In an embodiment of the invention, the realization of a communication system in cloud environment is divided into two or more tiers where the tiers have different processing capabilities. A cloud realization of a communication system can be designed as tiers with each layer handling a specific set of functions. Higher layers can be based on generic cloud architecture; lower layers may be specifically designed with high processing power architecture designed to meet requirements of a radio access network. The lower layers may be designed as HPC (High Performance Computing) utilising multiprocessors, accelerators and high speed connections between different units.

Figure 2:
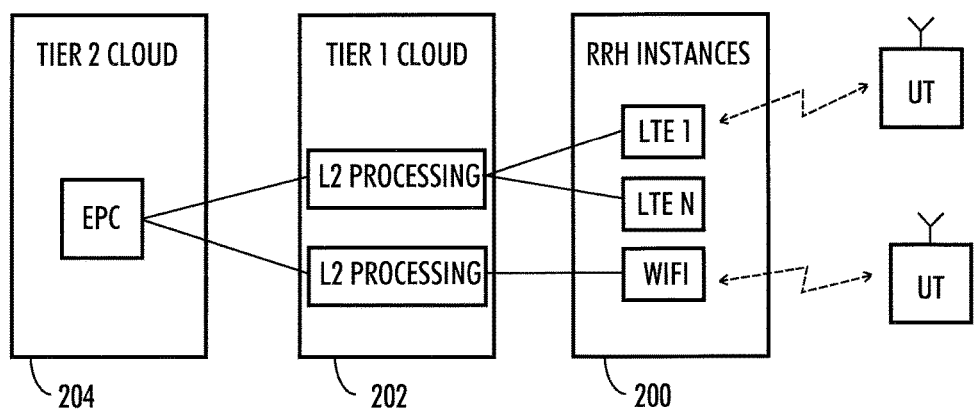
FIG. 2 illustrates an example of a possible cloud implementation of a communication system.

FIG. 2 illustrates an example of a possible cloud implementation of a communication system. In the example of FIG. 2, the system comprises a set of Remote Radio Heads (RRHs) 200. The RRHs may utilise different access methods. The cloud configuration of the system is divided in tiers partly based on the latency requirements of different operations of the network. In this example the cloud configuration is divided into two different tiers 202, 204. The first tier cloud 202 comprises low latency processing and RRH co-ordination. The first tier cloud 202 may support RRHs supporting different technologies such as Wi-Fi, LTE etc simultaneously. The first tier cloud 202 may use a HPC fabric internally to optimize the resource allocation for each technology and across technologies. The second tier cloud 204 comprises high latency or time tolerant operations such as EPC, for example.

In an embodiment, the lowest latency functions may be placed on the RRHs 200 itself. The L2 layer is placed in the first tier 202 on an intermediate level. This tier may be realised using HPC. The first tier may have highest processing capability of the tiers 202, 204. The physical location of the first tier may be determined on the basis of the information about the location and required quality of service of at least part of the one or more remote radio heads. The required quality of service of at least part of the one or more remote radio heads may comprise information on the allowed propagation delays when communicating with the remote radio heads, the number of missed calls, coverage areas, throughput, jitter, end-to-end call setup time and load on a particular remote radio head. The physical distance of the first tier cloud 202 from the RRHs 200 may be determined based on speed of propagation of signal from RRHs to the first tier over an optical interface, for example. Each first tier cloud 202 may support multiple RRHs as long as these RRHs fall within the physical distance limitation.

In an embodiment, the interfaces between different tiers 202, 204 may be determined. A criteria used in the determination may be the transport latency requirements between the tiers, for example. The interfaces may be realised using Common Public Radio Interface (CPRI™) standard.

In an embodiment, the processing capability required in the first tier may be determined on the basis of the information about the location and the required quality of service of at least part of the one or more remote radio heads.

The processing capabilities of the second tier 204 are typically less than highest processing capability required in the first tier 202. In an embodiment, the processing capability required in the second tier are determined on the basis of the information about the location and the required quality of service of at least part of the one or more remote radio heads.

In an embodiment, the processing requirements may be based on the latency requirements or other processing requirements of applications run in the system. Determining the processing capability required in each tier may comprise determining the number and quality of processors and associated hardware required to achieve required processing capability.

The current clouds are based on general commodity servers. While these may suffice for some of the data plane and OAM (Operation And Maintenance) operations, for the control plane and for latency sensitive lower layers such as MAC and PHY, commodity servers are not sufficient. Generic processors may not be sufficient by themselves either. Coprocessors and accelerators are required for dedicated functions such as ciphering, cyclic redundancy check (CRC) generation and verification and compression/decompression and to help with parallel processing in order to speed up the overall processing. The coprocessors and accelerators require fast interconnections in order to work in tandem with the processors and to ensure that latency is contained.

Figure 3:
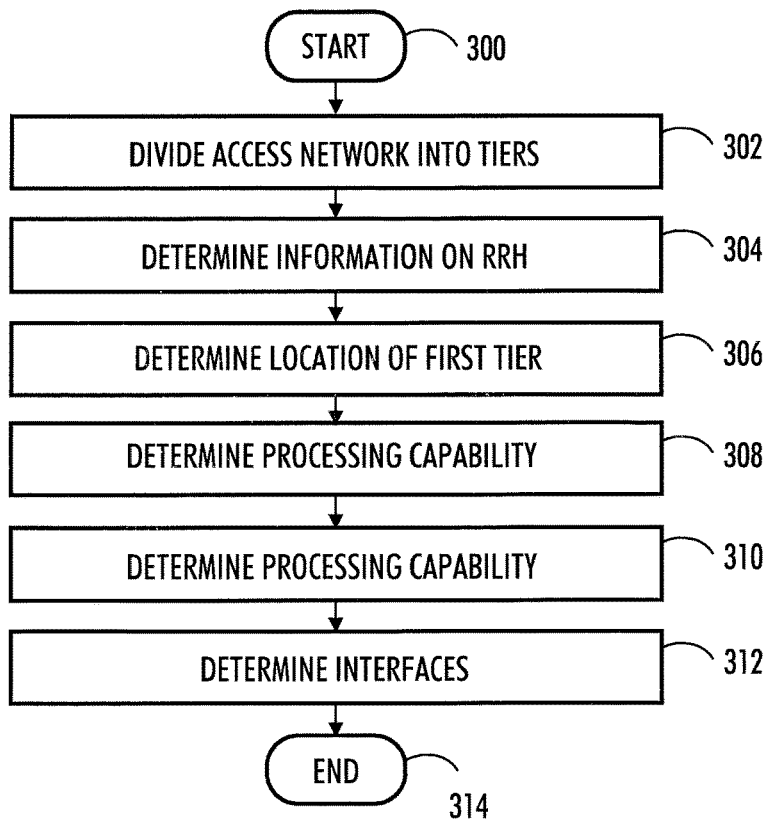
FIG. 3 is a flowchart illustrating some embodiments of the invention.

FIG. 3 is a flowchart illustrating an embodiment of the invention. The embodiment starts at step 300. Not all steps detailed in the example below are mandatory.

In step 302, the access network is divided into two or more tiers having different processing capabilities.

In step 304, information about the physical location of one or more remote radio heads of the network and required quality of service of the remote radio heads is received as an input;

In step 306, the physical location of the tier having most efficient processing capability for serving the remote radio heads is determined on the basis of the information about the location and required quality of service of at least part of the one or more remote radio heads. The tier having most efficient processing capability for serving the remote radio heads does not necessarily possess the highest processing capability, but it has the maximum matching resources as needed by the remote radio heads. For example, some tiers may not have accelerators needed to do the processing while they may still have highest processing power. They may not be suitable for acting as the first tier because of the lack of accelerators. A tier may contain multiple instances and we may be referring to any one instance or to the tier as a whole.

In step 308, the processing capability required in the tier having the most efficient processing capability is determined on the basis of the information about the location and the required quality of service of at least part of the one or more remote radio heads.

In step 310, the processing capability required in the tiers having less than the most efficient processing capability is determined on the basis of the information about the location and the required quality of service of at least part of the one or more remote radio heads.

In step 312, the tiers which need interconnection and the required interfaces between tiers are determined on the basis of the location, information on the quality of service of at least part of the one or more remote radio heads and the connections and locations of the different tiers.

The process ends in step 314.

The processing capability mentioned above comprises processing power (measured in number of cores used, for example) and the nature of processing needed.

The properties of connections between the remote radio heads and different tiers may be taken into account when determining processing capabilities required in different tiers and interfaces between the tiers. The properties may comprise the lengths of the connections and the media used (optical, copper or radio link, for example).

Embodiments of the invention makes it possible to design a cloud based RAN by taking latency issues into account. The resources allocated to a function may be selected to be optimal for that function. This includes specialized hardware requirements such as interfaces, accelerators and co-processors in addition to the latency constraint. Allocation of resources in a generic cloud may not be optimal for telecom applications.

Moving complexity from the eNodeBs to the first tier clouds enables the use of RRH and reduces costs in setting up a communication node, energy requirements and real estate footprint of a node and makes the RRHs a plug-and-play device that is easier to install and maintain.

RRHs may be situated close to the expected locations of user terminals. This reduces the power requirements of RRHs and terminals and increases battery life. If RRHs are placed close to user terminals this will in many cases allow line-of-sight coverage which opens up the possibility of using mmWave and cmWave technologies in addition to existing radio access technologies.

A good coverage may be achieved by moving eNodeB functionalities to first tiers and utilising RRHs that are easy to deploy. The first tiers may be HPC clouds. Higher tiers can reassign computation resources dynamically. Capacity is not only higher but easily scalable and elastic as well. Since most RRHs in an area connect to the same first tier cloud there is less context transfers. First tiers interconnection may facilitate inter-tier handovers. Mobility experience should therefore improve. Localized content and services are provided from the first tier clouds. Latency can be reduced to below 1 ms level by using content and computation resources available at the first tier clouds.

Figure 4:
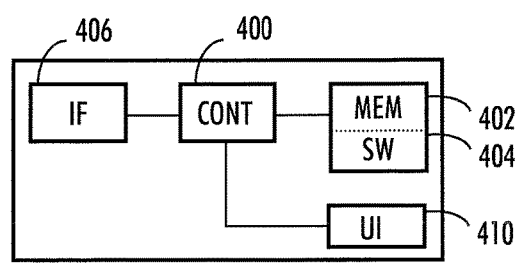
FIG. 4 illustrates an example of an apparatus employing some embodiments of the invention.

FIG. 4 illustrates an embodiment. The figure illustrates a simplified example of an apparatus in which embodiments of the invention may be applied. In some embodiments, the apparatus is a computing device.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus of the example includes a control circuitry 400 configured to control at least part of the operation of the apparatus. The control circuitry 400 is configured to execute one or more applications.

The apparatus may comprise a memory 402 for storing data or applications. Furthermore the memory may store software 404 executable by the control circuitry 400. The memory may be integrated in the control circuitry.

The apparatus may comprise a communication interface 406. The communication interface is operationally connected to the control circuitry 400. The communication interface enables the apparatus to communicate with other apparatuses and be in connection with the internet, for example.

The software 404 may comprise a computer program comprising program code means adapted to cause the control circuitry 400 of the apparatus to control the communication interface 406.

The apparatus may further comprise user interface 410 operationally connected to the control circuitry 400. The interface may comprise a (touch sensitive) display, a keypad, a microphone, and a speaker, for example.

In an embodiment, the applications may cause the apparatus at least to divide an access network into two or more tiers having different processing capabilities; receive as an input information about the physical location of one or more remote radio heads of the network and required quality of service of the remote radio heads; determine the physical location of the tier having highest processing capability on the basis of the information about the location and required quality of service of at least part of the one or more remote radio heads.

Figure 5:
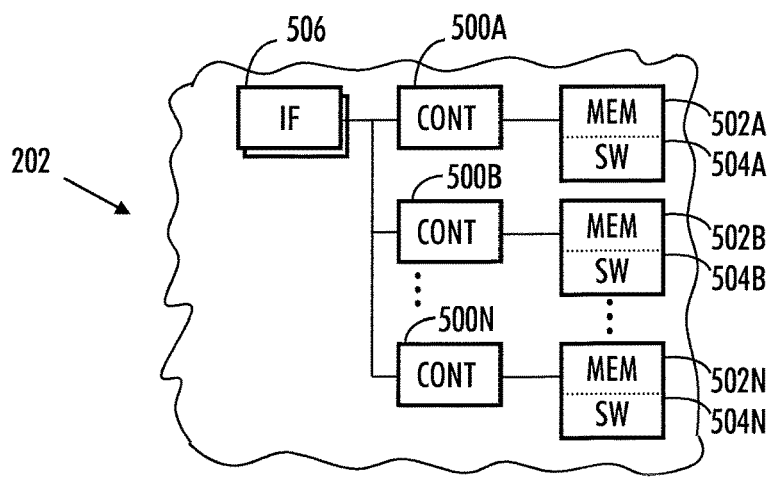
FIG. 5 illustrates an example of the structure of a tier.

FIG. 5 illustrates an example of the structure of a tier. It should be understood that the tier is depicted herein as an example illustrating some embodiments. It is apparent to a person skilled in the art that the realisation of a tier may also comprise other functions and/or structures and not all described functions and structures are required. The tier may be a first tier or another tier.

The tier 202 of the example includes one or more control circuitries 500A-500N configured to perform the functions assigned to the tier. The control circuitries 500A-500N may be configured to execute one or more applications. The control circuitries may be realized with processors, multiple set of interconnected processors, coprocessors, cores or other processing equipment.

Each control circuitry may comprise a memory 502A-502N for storing data or applications. Furthermore the memories may store software 504A-504N executable by the control circuitries 500A-500N. The memories may be integrated in the control circuitries.

The tier may comprise a set of communication interfaces 506. The communication interfaces are operationally connected to the control circuitries 500A-500N. The communication interfaces connect the tier to other tiers, RRHs and other networks such as the internet.

The software 504A-504N may comprise the functionalities required from the tier, for example.

If the tier illustrated in FIG. 5 is the first tier, the control circuitries and memories may be realised with HPC (High Performance Computing) utilising multiprocessors, accelerators and high speed connections between different circuitries.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step. The apparatuses or controllers able to perform the above-described steps may be implemented as an electronic digital computer, or a circuitry which may comprise a working memory (RAM), a central processing unit (CPU), and a system clock. The CPU may comprise a set of registers, an arithmetic logic unit, and a controller. The controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

Figure 6:
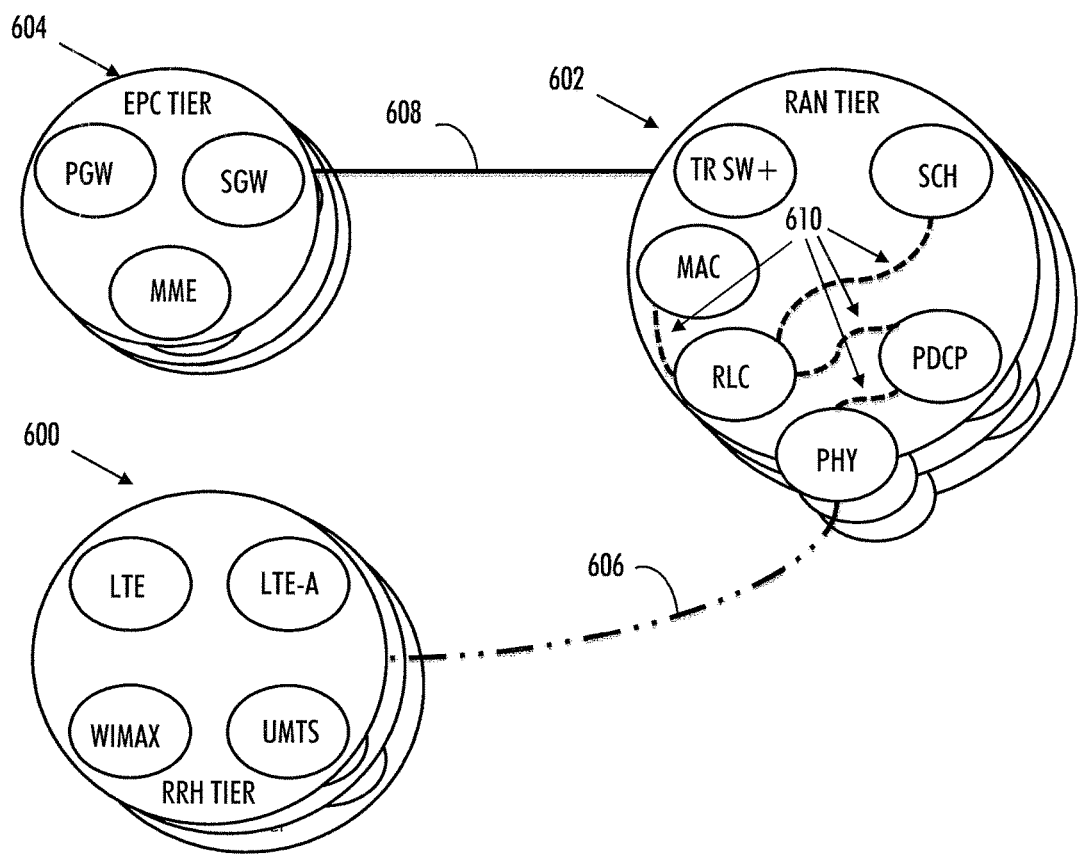
FIG. 6 illustrates an example of tiers and interfaces between tiers.

FIG. 6 illustrates an example of tiers and interfaces between tiers. Three tiers are illustrated: an RRH tier 600, an RAN tier 602 and a EPC tier 604. Each tier may have multiple instances. The RRH tier communicates with the remote radio heads which may utilise different access technologies, in this example UMTS, WiMAX, LTE and LTE-A. The interface 606 between the RRH tier and the Radio Access network tier 602 is a low latency interconnect fabric. Typically it may be realized with a fibre connection, but other realisations are feasible as well.

The RAN tier may comprise components which are responsible for the realisation of physical layer (PHY), Radio Link layer (RLC), Synchronisation Channel (SCH), Packet Data Convergence Protocol (PDCP), Medium Access Control (MAC) and transport software (TR SW+). These components are merely illustrative examples. The connections 610 between the components are typically low latency connections. The interface 608 between the RAN tier 602 and the Evolved Packet Core Tier 604 is typically a medium latency interconnect fabric. Typically it may be IP based and realized with a wireless connection, but other (wired) realisations are feasible as well.

The EPC tier 604 comprises in this example components for P-GW, S-GW and MME. These components are merely illustrative examples.

In an embodiment, the design of the interfaces between different tiers and intra-tier interfaces between components within a tier takes into account latency, end-point functionality, interoperability of tiers, functions within the tiers, and possible standards related to connections, for example. Each tier may have peer-to-peer interfaces.

In an embodiment, the components belonging to each tier may be determined based on the physical location of the components, processing capabilities of the components, the required processing capability of each tier and required quality of service between the components in a tier.

In an embodiment, the physical location, processing capability and functionality of the components within a cloud are determined and components for each tier are selected based on the determination.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus for designing a cloud based radio access network, comprising:
    at least one processor; and
    at least one memory including computer program code,
    the at least one memory and the computer program code configured to, with the at least one processor, cause the apparatus at least to:
    divide processing elements of the cloud based radio access network into two or more heterogenous tiers comprising control circuitries having different processing capabilities;
    receive as an input information about the physical location of one or more remote radio heads of the network and required quality of service of the remote radio heads and properties of connections between the remote radio heads and one or more of the heterogenous tiers;
    determine the physical location of the heterogenous tier having most efficient processing capability for serving the remote radio heads on the basis of the information about the location and required quality of service of at least part of the one or more remote radio heads and properties of connections between the remote radio heads and one or more of the heterogenous tiers,
    wherein the required quality of service is indicated by meeting an overall timing budget, and
    wherein the different processing capabilities comprises a level of processing power and a nature of processing needed.

2. The apparatus of claim 1, the at least one memory and the computer program code configured to, with the at least one processor, cause the apparatus, further to:
    determine the processing capability required in the tier having most efficient processing capability for serving the remote radio heads on the basis of the information about the location and the required quality of service of at least part of the one or more remote radio heads.

3. The apparatus of claim 1, the at least one memory and the computer program code configured to, with the at least one processor, cause the apparatus, further to:

determine the processing capability required in the tiers having less than most efficient processing capability on the basis of the information about the location and the required quality of service of at least part of the one or more remote radio heads.

4. The apparatus of claim 1, wherein the required quality of service of at least part of the one or more remote radio heads comprises information on at least one of the following: the allowed propagation delays when communicating with the remote radio heads, the number of missed calls, coverage areas, throughput, jitter, end-to-end call setup time and load on a particular remote radio head.

5. The apparatus of claim 1, the at least one memory and the computer program code configured to, with the at least one processor, cause the apparatus, further to:
take allowed propagation delays in communication with remote radio heads into account when determining the processing capabilities required in the different tiers.

6. The apparatus of claim 1, the at least one memory and the computer program code configured to, with the at least one processor, cause the apparatus, further to:
determine which tiers need interconnection and the required interfaces between tiers on the basis of the location, information on the quality of service of at least part of the one or more remote radio heads and the connections and locations of the different tiers.

7. The apparatus of claim 2, wherein determining the processing capability required in each tier comprises determining the number and quality of processors and associated hardware required to achieve required processing capability.

8. The apparatus of claim 1, the at least one memory and the computer program code configured to, with the at least one processor, cause the apparatus, further to:
determine the components belonging to each tier based on the physical location and processing capabilities of the components, the required processing capability of each tier and required quality of service between the components in a tier.

9. The apparatus of claim 1, the at least one memory and the computer program code configured to, with the at least one processor, cause the apparatus, further to:
determine the physical location, processing capability and functionality of the components within a cloud,
select components for each tier based on the determination.

10. An apparatus for designing a cloud based radio access network, comprising:
means for dividing processing elements of the cloud based radio access network into two or more heterogenous tiers comprising control circuitries having different processing capabilities;
means for receiving as an input information about the physical location of one or more remote radio heads of the network and required quality of service of the remote radio heads and properties of connections between the remote radio heads and one or more of the heterogenous tiers; and
means for determining the physical location of the heterogenous tier having most efficient processing capability for serving the remote radio heads on the basis of the information about the location and required quality of service of at least part of the one or more remote radio heads and properties of connections between the remote radio heads and one or more of the heterogenous tiers,
wherein the required quality of service is indicated by meeting an overall timing budget, and
wherein the different processing capabilities comprises a level of processing power and a nature of processing needed.

11. A method for designing a cloud based radio access network, comprising:
dividing processing elements of the cloud based radio access network into two or more heterogenous tiers comprising control circuitries having different processing capabilities;
receiving as an input information about the physical location of one or more remote radio heads of the network and required quality of service of the remote radio heads and properties of connections between the remote radio heads and one or more of the heterogenous tiers; and
determining the physical location of the heterogenous tier having most efficient processing capability for serving the remote radio heads on the basis of the information about the location and required quality of service of at least part of the one or more remote radio heads and properties of connections between the remote radio heads and one or more of the heterogenous tiers,
wherein the required quality of service is indicated by meeting an overall timing budget, and
wherein the different processing capabilities comprises a level of processing power and a nature of processing needed.

12. The method of claim 11, further comprising:
determining the processing capability required in the tier having most efficient processing capability for serving the remote radio heads on the basis of the information about the location and the required quality of service of at least part of the one or more remote radio heads.

13. The method of claim 11, further comprising:
determining the processing capability required in the tiers having less than most efficient processing capability on the basis of the information about the location and the required quality of service of at least part of the one or more remote radio heads.

14. The method of claim 11, wherein the required quality of service of at least part of the one or more remote radio heads comprises information on at least one of the following: the allowed propagation delays when communicating with the remote radio heads, the number of missed calls, coverage areas, throughput, jitter, end-to-end call setup time and load on a particular remote radio head.

15. The method of claim 11, further comprising:
taking allowed propagation delays in communication with remote radio heads into account when determining the processing capabilities required in the different tiers.

16. The method of claim 11, further comprising:
determining required interfaces between tiers on the basis of the location, information on the quality of service of at least part of the one or more remote radio heads and the connections and locations of the different tiers.

17. The method of claim 12, wherein determining the processing capability required in each tier comprises determining the number and quality of processors and associated hardware required to achieve required processing capability.

18. A computer program embodied on a non-transitory computer readable medium, comprising program instructions which, when loaded into an electronic apparatus for designing a cloud based radio access network, are configured to control the apparatus to execute:

divide processing elements of the cloud based radio access network into two or more heterogenous tiers comprising control circuitries having different processing capabilities;

receive as an input information about the physical location of one or more remote radio heads of the network and required quality of service of the remote radio heads and properties of connections between the remote radio heads and one or more of the heterogenous tiers;

determine the physical location of the heterogenous tier having most efficient processing capability for serving the remote radio heads on the basis of the information about the location and required quality of service of at least part of the one or more remote radio heads and properties of connections between the remote radio heads and one or more of the heterogenous tiers, wherein the required quality of service is indicated by meeting an overall timing budge, and wherein the different processing capabilities comprises a level of processing power and a nature of processing needed.

\* \* \* \* \*